United States Patent
Zhang et al.

(10) Patent No.: US 7,296,159 B2
(45) Date of Patent: Nov. 13, 2007

(54) KEY DISTRIBUTION IN A CONDITIONAL ACCESS SYSTEM

(75) Inventors: Jian Zhang, Shanghai (CN); Zong Wei Liu, Beijing (CN); Ling Shao, Beijing (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 10/667,841

(22) Filed: Sep. 22, 2003

(65) Prior Publication Data

US 2004/0120529 A1    Jun. 24, 2004

(30) Foreign Application Priority Data

Sep. 23, 2002    (CN) ............................... 02 1 42880

(51) Int. Cl.
    *G06F 1/24*    (2006.01)
(52) U.S. Cl. .................. 713/171; 713/164; 713/165; 713/166
(58) Field of Classification Search ................ 713/171, 713/164, 165, 166
    See application file for complete search history.

(56) References Cited

U.S. PATENT DOCUMENTS

| | | | | |
|---|---|---|---|---|
| 5,394,469 A | * | 2/1995 | Nagel et al. | 705/53 |
| 5,483,595 A | * | 1/1996 | Owen | 380/271 |
| 5,504,814 A | * | 4/1996 | Miyahara | 726/4 |
| 5,568,554 A | * | 10/1996 | Eastlake, III | 713/181 |

* cited by examiner

*Primary Examiner*—Thomas R. Peeso
(74) *Attorney, Agent, or Firm*—Lisa M. Yamonaco; Louis P. Herzberg

(57) ABSTRACT

Methods and apparatus for key distribution in a conditional access system, assuming that the set of all user nodes which the system can accommodate is a complete set, and a subset is composed of all user nodes or part of user nodes. One method comprises: decomposing said subset into at least one secondary subset; assigning a different user key to each secondary subset, each said user key being transmitted to all users in a corresponding secondary subset; encrypting an entitlement key by using each said user key so as to generate a cipher text corresponding to each said secondary subset; and combining said cipher text to generate a media key control block and transmitting said media key control block to all users in said subset. Since a classification method of a binary tree and a multiple tree is used, the invention can save a lot of network resources.

25 Claims, 9 Drawing Sheets

1. sub-tree associated with node a
2. sub-tree associated with node v
3. sub-tree difference identified by D'(u,v)

1. subset difference D(u1,v1)
2. subset difference D(u2,v2)
3. subset difference D(u3,v3)
4. subset difference D(u4,v4)

KEY DISTRIBUTION IN A CONDITIONAL ACCESS SYSTEM

FIELD OF INVENTION

The present invention relates to a conditional access system, more particularly to a key distribution method and apparatus in a conditional access (CA) system.

BACKGROUND ART

A CA system is vital to a cable/satellite pay-TV broadcaster, and the most important part in a CA system is how to add legal users (paid users) into the system and remove illegal users from the system dynamically. The basic architecture of a CA system is EMM (entitlement management message), ECM (entitlement control message), CW (control word), Stream. As shown in FIG. 1, an operator (transmitting side) broadcasts EMM and ECM to each legal user through network broadcasting, the EMM contains a message to be transferred to each user (receiving side) and this message contains an entitlement key (i.e. media key, MK) needed by the user. Each user's device filters the EMM when receiving it, and upon obtaining the message to be transferred to the user in the EMM, the message is decrypted by using a user key (distributed to the user by way of smart card or other means) obtained in advance from the operator so as to obtain the entitlement key therein, then the entitlement key is used to decrypt ECM to obtain CW that is used to encrypt video streams (e.g. MPEG-2). Thus, legal users can watch an encrypted video program by using the entitlement key dynamically distributed to them by the operator, while unpaid users (illegal users) can not watch the encrypted video program due to not obtaining the entitlement key.

In this CA system, EMMs play an important role for distributing the entitlement key. But unfortunately, the length of EMM is quite long in most CA systems. Generally, the length is proportional to the number of users within the CA system, which may grow tremendously in a large system. Because of its length, more bandwidth may be taken to broadcast EMMs, and sometimes, users have to turn on their set-top boxes in order to receive EMMs. Since TS stream of MPEG-2 allows to combine many code streams together, EMM and ECM are transferred together with video streams instead of being transferred through a single channel. Also, EMM varies once a month while ECM varies once per ten seconds, so the bandwidth occupied when they are transmitted can severely influence the receiving and viewing of video programs. This situation causes some services like PPV (Pay Per View), IPPV (Impulsive Pay Per View) and Near-VOD quite inconvenient. For example, in a traditional CA system with 10,000 users, if 1% users (100 users) want to leave the system, the system has to send to each user among the left 9,900 users an EMM containing information of each user, notifying them to change their group and the original entitlement keys they own. Thus it will occupy a large amount of bandwidth to broadcast these notifications, thereby wasting a lot of resources.

SUMMARY OF INVENTION

In order to solve the above-mentioned problems, the object of the present invention is to provide a key distribution method and apparatus in a conditional access system. The method is dividing legal users into various groups according to a certain condition, and distributing identical user keys to the users within the same group, therefore a plurality of users can use the identical user keys to obtain the entitlement keys.

In order to achieve the above object, the present invention provides a key distribution method in a conditional access system, assuming that the set of all user nodes which the system can accommodate is a complete set, and a subset is composed of all or part of the user nodes, comprising the steps of: decomposing said subset into at least one secondary subset; distributing a different user key to each secondary subset, each said user key being transmitted to all users in a corresponding secondary subset; encrypting an entitlement key by using each said user key so as to generate a cipher text corresponding to each said secondary subset; and combining said cipher text to generate a media key control block.

The present invention also provides an apparatus for key distribution in a conditional access system, assuming that the set of all user nodes which the system can accommodate is a complete set, and a subset is composed of all or part of the user nodes, said apparatus comprising: a decomposing unit for decomposing said subset into at least one secondary subset, and distributing a different user key to each secondary subset, each said user key being transmitted to all users in a corresponding secondary subset; a generating unit for encrypting an entitlement key by using each said user key so as to generate each cipher text corresponding to each said secondary subset; a combining unit for combining said cipher text to generate a media key control block; and an entitlement control means for controlling the corresponding operation of each said unit and outputting said media key control block.

BRIEF DESCRIPTION OF DRAWINGS

The above and other objects and advantages of the present invention will become more apparent by further describing the present invention with reference to the embodiments and accompanying drawings, in which.

DESCRIPTION OF THE INVENTION

Figure 1:
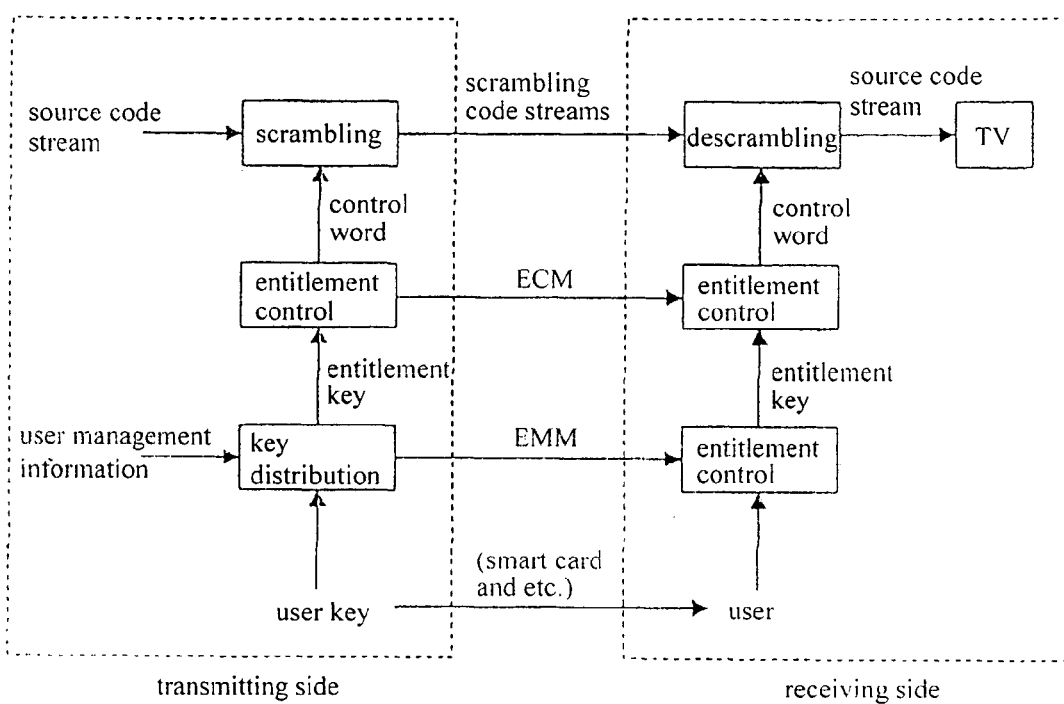
FIG. 1 is a schematic diagram of the transmitting side and receiving side in a conventional conditional access system.

The present invention provides key distribution methods and apparatus in a conditional access system. An example method of the present invention, divides legal users into various groups according to a certain condition, and distributes identical user keys to the users within the same group, therefore a plurality of users can use the identical user keys to obtain the entitlement keys.

In an example embodiment, the present invention provides a key distribution method in a conditional access system, assuming that the set of all user nodes which the system can accommodate is a complete set, and a subset is composed of all or part of the user nodes, comprising the steps of: decomposing said subset into at least one secondary subset; distributing a different user key to each secondary subset, each said user key being transmitted to all users in a corresponding secondary subset; encrypting an entitlement key by using each said user key so as to generate a cipher text corresponding to each said secondary subset; and combining said cipher text to generate a media key control block. Wherein a binary tree algorithm is used to decompose said subset into said at least one secondary subset.

The present invention also provides an apparatus embodiment for key distribution in a conditional access system, assuming that the set of all user nodes which the system can accommodate is a complete set, and a subset is composed of all or part of the user nodes, said apparatus comprising: a decomposing unit for decomposing said subset into at least one secondary subset, and distributing a different user key to each secondary subset, each said user key being transmitted to all users in a corresponding secondary subset; a generating unit for encrypting an entitlement key by using each said user key so as to generate each cipher text corresponding to each said secondary subset; a combining unit for combining said cipher text to generate a media key control block; and an entitlement control means for controlling the corresponding operation of each said unit and outputting said media key control block.

The present invention also provides an embodiment of a transmitting apparatus in a conditional access system, assuming that the set of all user nodes which the system can accommodate is a complete set, and a subset is composed of all or part of the user nodes, comprising: a decomposing unit for decomposing said subset into at least one secondary subset, and distributing a different user key to each secondary subset, each said user key being transmitted to all users in a corresponding secondary subset; a generating unit for encrypting an entitlement key using each said user key so as to generate a cipher text corresponding to each said secondary subset; a combining unit for combining said cipher text to generate a media key control block; a program scrambling unit for scrambling a video program by using said entitlement key; a transmitting unit for transmitting the scrambled video program and said media key control block to a receiving apparatus; and an entitlement control means for controlling the corresponding operation of each of said units and outputting said media key control block to said transmitting unit.

The present invention also provides an embodiment for a receiving apparatus in a conditional access system, assuming that the set of all user nodes which the system can accommodate is a complete set, and a subset is composed of all or part of the user nodes, comprising: a receiving unit for receiving the scrambled video program and a media key control block transmitted from a transmitting apparatus; a resolving unit for decrypting a cipher text by using a user key so as to obtain an entitlement key, wherein said cipher text is obtained by identifying said media key block using the user key corresponding to the secondary subset to which said receiving apparatus belongs, and said secondary subset is obtained by decomposing said subset; and a program descrambling unit for decrypting said scrambled video program by using said entitlement key.

Since the present invention uses a binary tree classification method, a plurality of users in the same group can share a message to obtain entitlement keys, thereby reducing the amount of the information (length) of the EMM (MKCB in the present invention) for distributing the entitlement keys, and making the length of MKCB greatly less than that of the conventional linear management, especially in the case of user leaving from the system. So the present invention can save the large amount of bandwidth occupied when broadcasting EMM, i.e. saving a lot of network resources.

The present invention will be described in detail hereinafter in connection with the drawings and specific embodiments.

Definition and Feature of Media Key Control Block (MKCB)

The MKCB method of the present invention can be used to implement a EMM layer in a CA system.

Let the complete set I be the set of all users or devices (nodes) (i.e. all the users that the system can accommodate), and let S be a subset of I, representing registered legal users (e.g. paid users). In the present invention, a binary algorithm (which will be described in more detail below) is used to decompose subset S into a plurality of secondary subsets D1, D2 . . . , Dn, and different user keys are assigned to the secondary subsets, and the users in each secondary subset have the same user keys. Then entitlement keys are encrypted into cipher texts E1, E2, . . . , En by using various different user keys, the above cipher texts are combined to generate the media key control block of the present invention, MKCB(S, MK), the entitlement key (MK) in the MKCB(S, MK) can be used to encrypt the control word (CW) of a specific video program into ECM, and the CW is used to encrypt the above video program. Certainly, the above video program can also be encrypted by using directly the entitlement key (MK), in this case no control word is needed to encrypt the video program.

In the implementing method of MKCB, a ternary tree algorithm or a multiple tree algorithm can also be used to decompose subset S into a plurality of subsets. In the embodiment of the present invention, MKCB is implemented by using a binary tree algorithm, which will be described in detail below. When this binary tree algorithm is used to implement MKCB, because of changing traditional linear management for users into grouping management, the length of MCKB is not linear to the increase of the number of users in subset S and is very short in most cases.

Apparatus and Method for Generating and Distributing MKCB in a CA System

Figure 2:
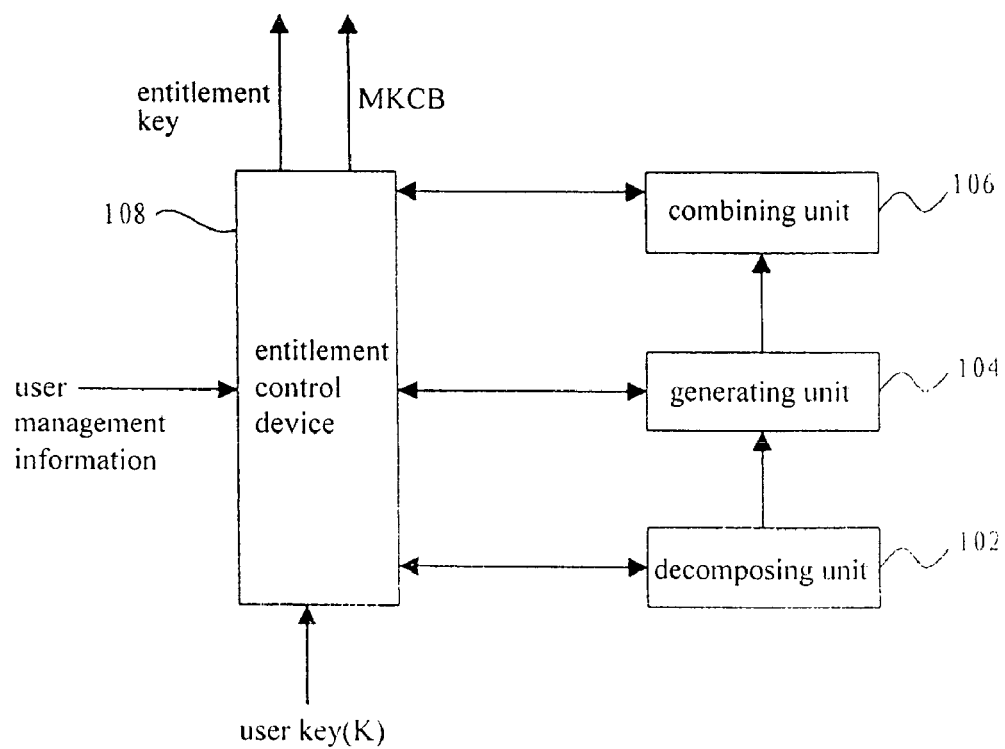
FIG. 2 shows the structure of a key distribution apparatus used in a conditional access system according to the present invention.

FIG. 2 is a structural diagram of a key distribution apparatus 1 in a CA system according to the present invention.

As shown in FIG. 2, the key distribution apparatus 1 used in a CA system in the present invention comprises: a decomposing unit 102 for decomposing the subset S into at least a secondary subset Di, and assigning different user keys Ki to each secondary subset, each user key Ki is transmitted to all the users in the secondary subset corresponding to the key (e.g., by way of a master card or other means); a generating unit 104 for using each user key Ki to encrypt an entitlement key (MK) so as to generate each cipher text Ei corresponding to each secondary subset; a combining unit 106 for combining each cipher text Ei to generate a media key control block MKCB; and an entitlement control device 108 for controlling the corresponding operations of the above-mentioned units and outputting said media key control block. In addition, the entitlement control device 108 may also be used to manage user information, that is, to incorporate other user management information to be transmitted to users by an operator into the media key control block (MKCB).

The decomposing unit 102 uses a binary tree algorithm to decompose the subset S into a plurality of secondary subsets D1, D2, . . . , Dn, assigns different user keys to the plurality of secondary subsets D1, D2, . . . , Dn, encrypts said entitlement keys by using said user keys, and combines the cipher texts E1, E2, . . . , En obtained after encrypting entitlement keys, so as to generate the media key control block of present invention, MKCB={E1,E2, . . . ,En}.

The above-mentioned key distribution apparatus of the present invention can transmit the media key control block MKCB in an unidirectional channel of the CA system of video/audio broadcast, and conduct unidirectional management to each user node. In addition, in the present invention, the plurality of secondary subsets D1, D2, . . . , Dn divided through a binary tree method by decomposing unit 102 can be maintained unchanged in the future usage after being determined when the system is established (except that the system needs to be changed, e.g. the capacity of the system is changed). Thus the heavy workload brought about by conducting dynamic management is avoided, and the large amount of network bandwidth needed for conducting dynamic interactive management is also saved.

The MKCB can be broadcast to legal users before a specific program begins, and can also be broadcast together with the program. Due to its short length, its broadcast time and manner are very flexible.

Figure 3:
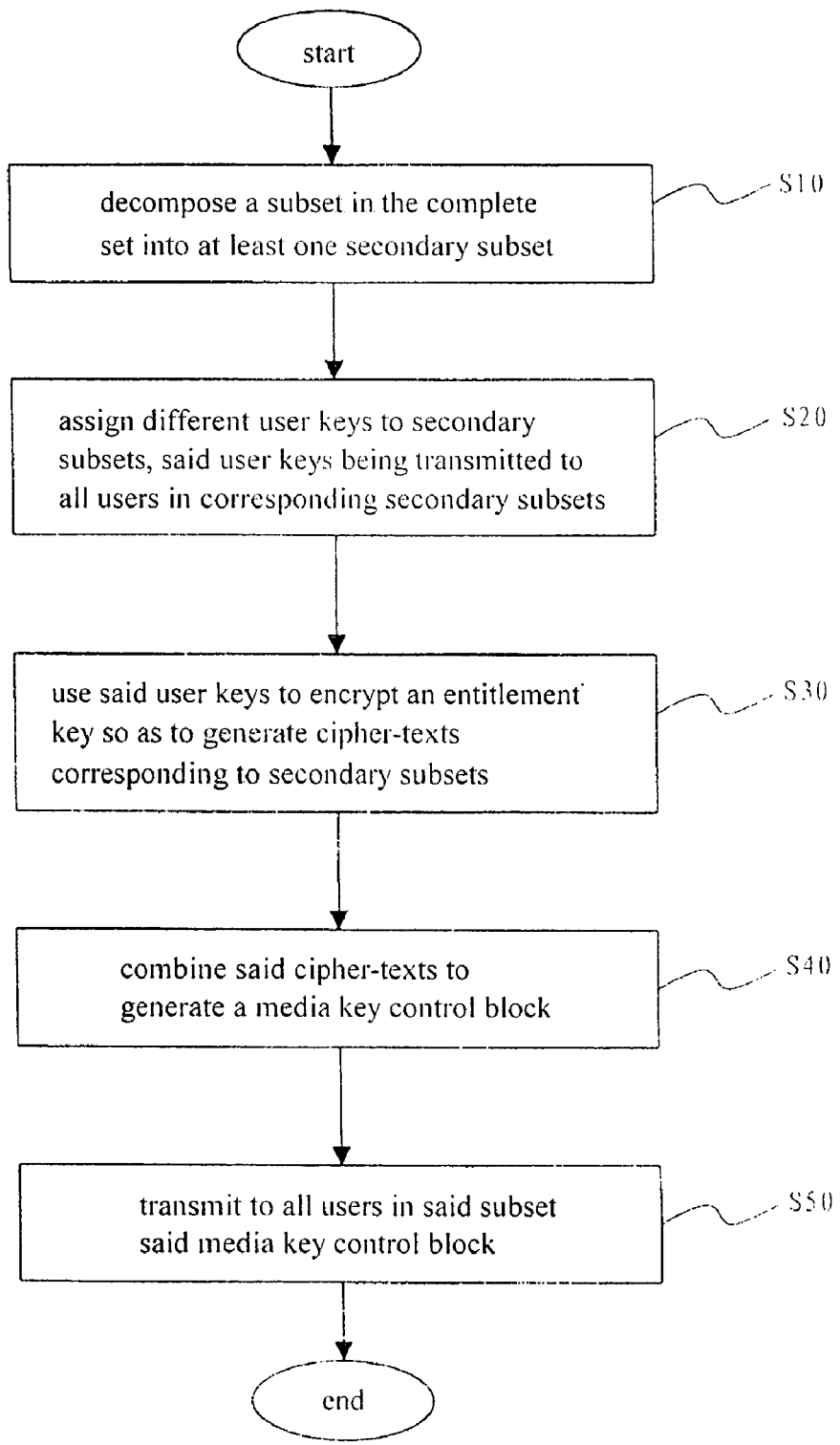
FIG. 3 is a flowchart of a key distribution used in a conditional access system according to the present invention.

FIG. 3 is a work flowchart of the key distribution apparatus used in a CA system in FIG. 2. As shown in FIG. 3, at step S10, decomposing unit 102 decomposes a subset S in the complete set I into at least one secondary subset D1, D2, . . . , Dn, and assigns different user keys Ki's to the above-mentioned secondary subsets (step S20), said each user key Ki is transmitted to all the users in the secondary subset corresponding to the user key. At step S30, generating unit 104 uses each said user key Ki to encrypt an entitlement key (MK) so as to generate each cipher text Ei (i.e. E1, E2, . . . , En) corresponding to each secondary subset. At step S40, combining unit 106 combines said cipher text Ei to generate a media key control block MKCB={E1,E2, . . . ,En}. In addition, at step S50, the generated media key control block (MKCB) is output through the entitlement control device 108 and is transmitted to all the users within subset S via a transmitting unit.

The video program transmitting apparatus using key distribution apparatus in FIG. 2 according to the present invention will be described in detail hereinafter, in which the same parts as that of the key distribution apparatus in FIG. 2 are indicated with the same reference numerals, and the description for their same functions will be omitted for simplicity.

Figure 4:
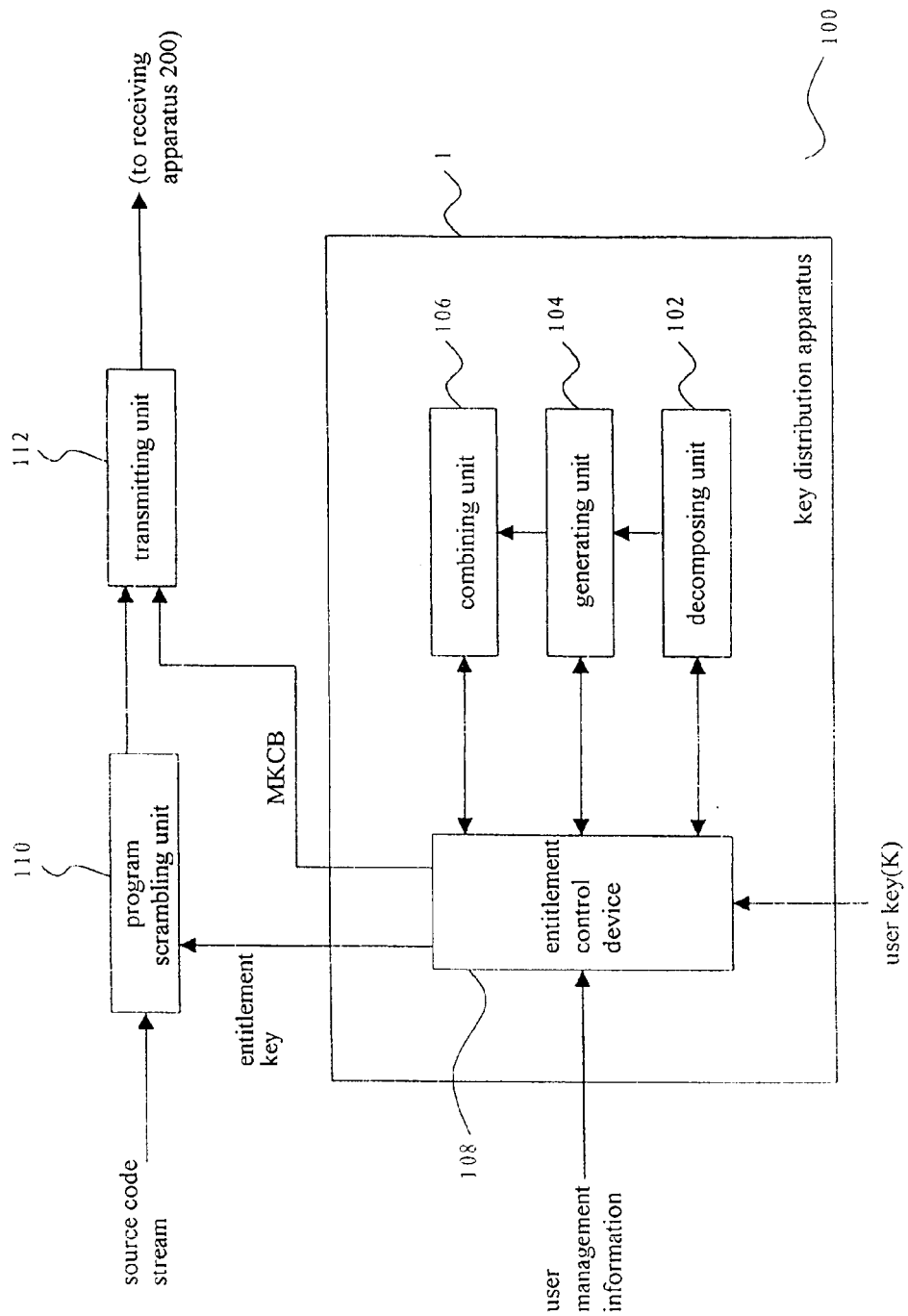
FIG. 4 is a structural diagram of a video program transmitting apparatus used in a conditional access system according to an embodiment of the present invention.

FIG. 4 is a structural diagram of the video program transmitting apparatus 100 used in a CA system according to an embodiment of the present invention.

Figure 5:
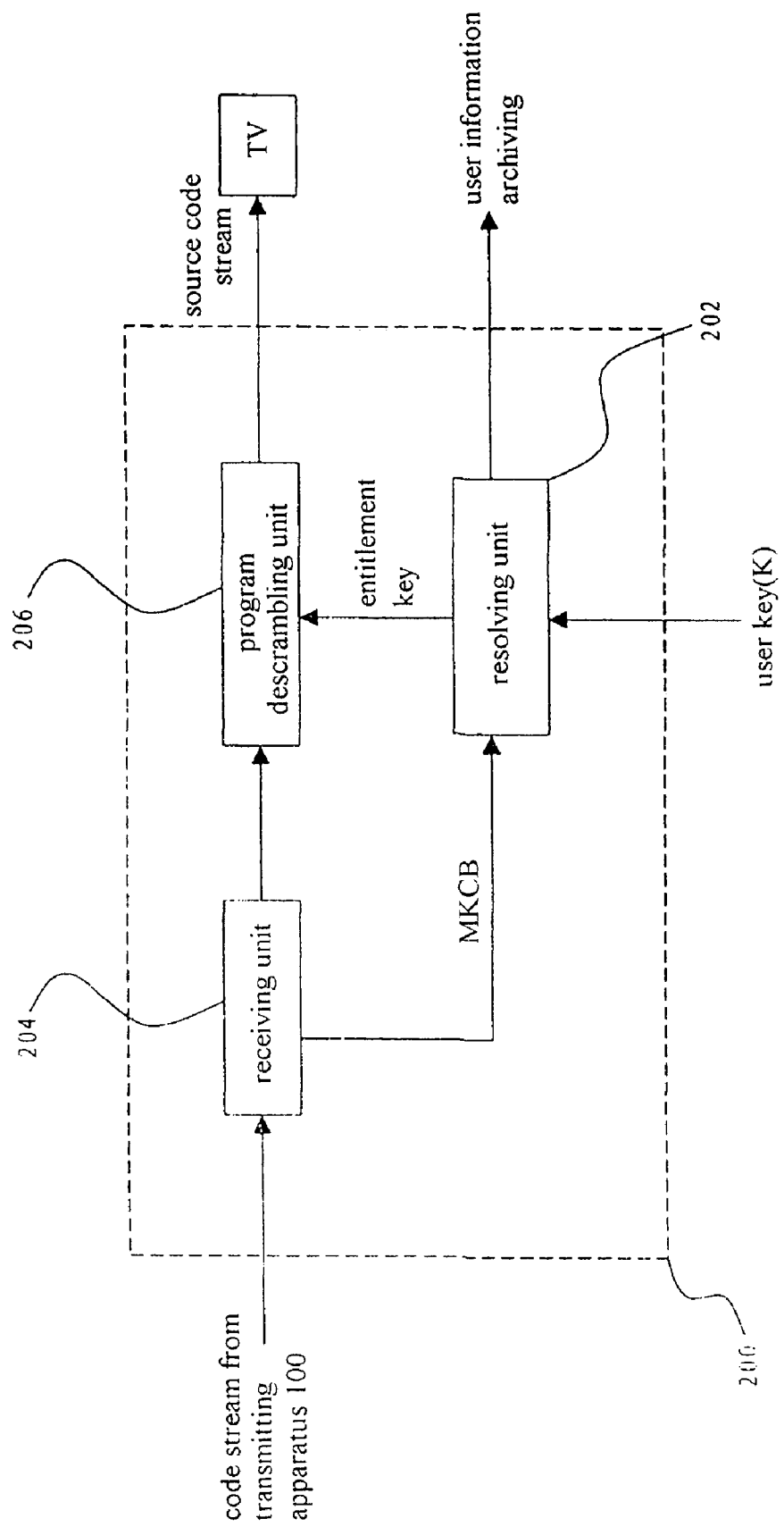
FIG. 5 is a structural diagram of a video program receiving apparatus used in a conditional access system according to an embodiment of the present invention.

As shown in FIG. 4, the video program transmitting apparatus 100 comprises: a decomposing unit 102, a generating unit 104, a combining unit 106 and an entitlement control unit 108, all of which have the same functions and structures as those of the same units shown in FIG. 2. In addition, the video transmitting apparatus 100 further comprises: a program scrambling unit 110 for using entitlement key (MK) to scramble a source code stream (video program) from a video program generating device (not shown); a transmitting unit 112 for transmitting the scrambled video program and the media key control block to a receiving apparatus 200 (as shown in FIG. 5).

The video program receiving apparatus 200 according to the present invention will be described in detail with respect to the drawings. FIG. 5 is a structural diagram of the video program receiving apparatus 200 in a CA system according to an embodiment of the present invention. As shown in FIG. 5, the video program receiving apparatus 200 comprises: a receiving unit 204 for receiving the scrambled video program and the media key control block transmitted from the transmitting apparatus 100; a resolving unit 202 for identifying said media key block MKCB to obtain the cipher text Ei (i.e. one of E1, E2, . . . , En) corresponding to the secondary subset Di to which the receiving apparatus 200 belongs, and using the user key Ki corresponding to the secondary subset Di to decrypt the cipher text Ei so as to obtain an entitlement key (MK); a program descrambling unit 206 for decrypting the scrambled video program by using the obtained entitlement key (MK), and transmitting the descrambled video program to the receiving or playing device such as TV and etc. for reception or playback.

Of course, the resolving unit 202 may also be used to manage user information, obtain the information transmitted to the user by an operator after decrypting MKCB, and send it to other devices (not shown) for archiving or other processing.

Herein, for any given legal user subset S in the complete set I including all the user nodes which can be accommodated, the entitlement key (MK) in MKCB(S, MK) can and only can be decrypted by the users in subset S, and the MK is used to encrypt MPEG video stream. Thus the users in subset S (legal paid users), after decrypting MKCB to obtain the MK, can further obtain the descrambled MPEG video stream.

Figure 6:
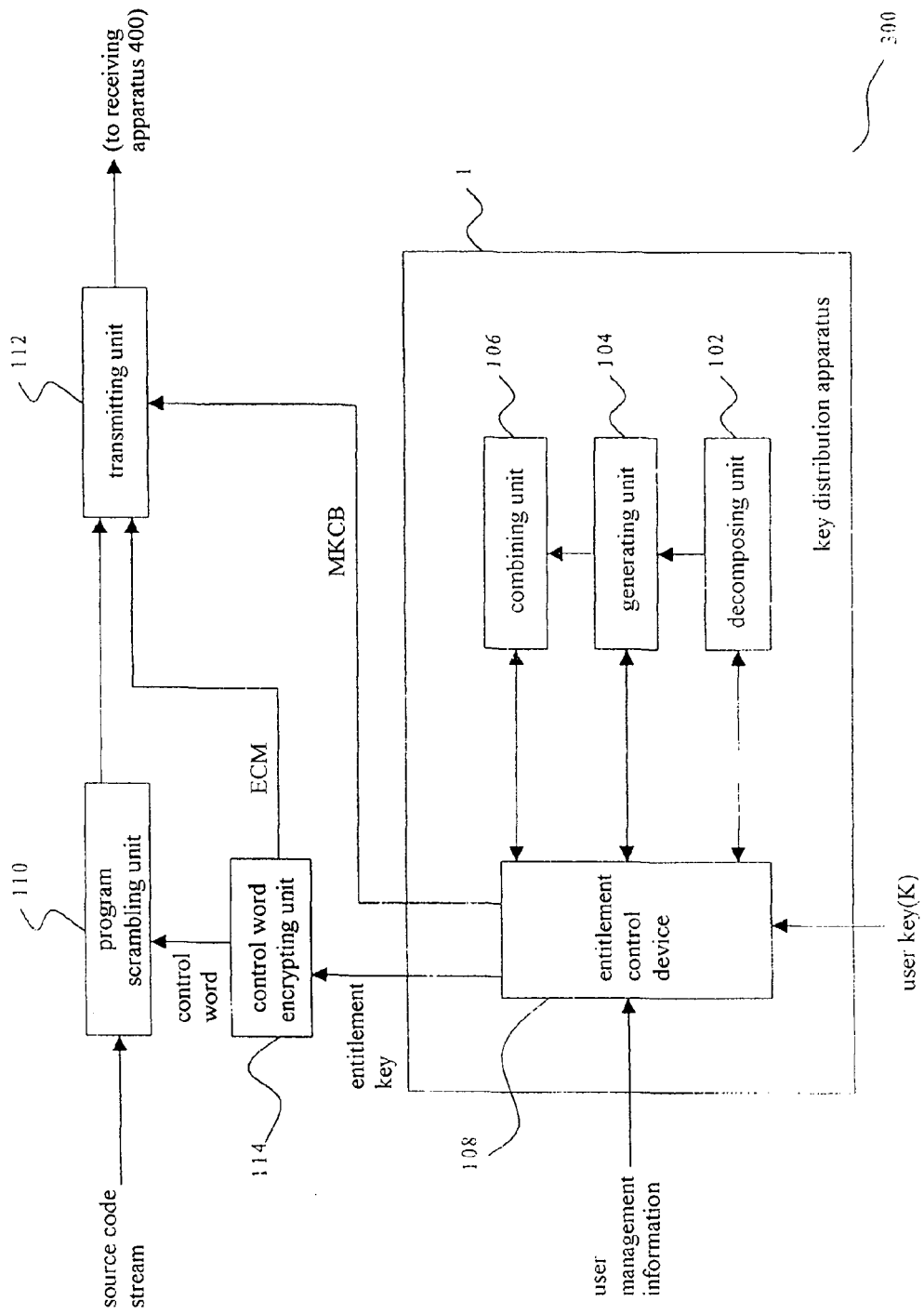
FIG. 6 is a structural diagram of a video program transmitting apparatus used in a conditional access system according to another embodiment of the present invention.

Another embodiment of the video transmitting apparatus according to the present invention will be described in connection with FIG. 6, in which the same units as those of video transmitting units in FIG. 4 are the same reference numerals, and the description of the same functions will be omitted for simplicity. FIG. 6 is a structural diagram of the video program transmitting apparatus 300 used in a CA system according to another embodiment of the present invention. As shown in FIG. 6, the video transmitting apparatus 300 comprises: a decomposing unit 102, a generating unit 104, a combining unit 106, an entitlement control unit 108 and a transmitting unit 112, all of which have the same functions and structures as those of the same units as shown in FIG. 4 and will not be described further. In addition, the video transmitting apparatus 300 further comprises: a control word encrypting unit 114 for, under the control of the entitlement control unit 108, using the entitlement key (MK) to encrypt a control word (CW) into the above-mentioned cipher text Ei.

It also differs from the video transmitting apparatus 100 in that: the program scrambling unit 110 of the video transmitting apparatus 300 in the present embodiment is used to use the control word (CW) to encrypt a source code stream (video program) from a video program generating device (not shown) so as to generate the scrambled video programs. Herein, the cipher text Ei is the entitlement control message (ECM) in a CA system. Another embodiment of the video receiving apparatus in the present invention will be described hereinafter in connection with FIG. 7, in which the same units as those in the video receiving apparatus 200 in FIG. 5 are indicated with the same reference numerals, and the description of their same functions will be omitted for simplicity.

Figure 7:
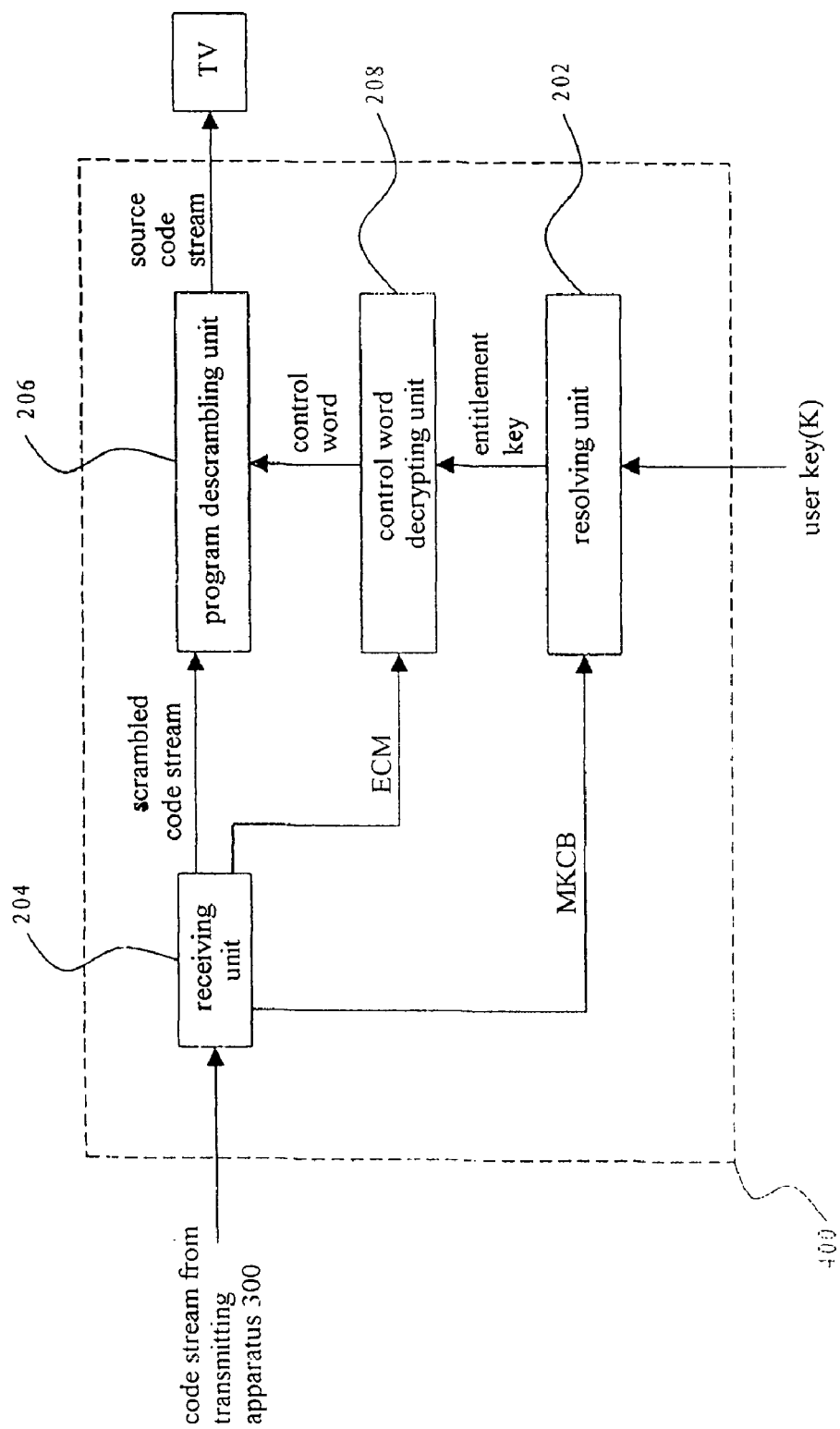
FIG. 7 is a structural diagram of a video program receiving apparatus used in a conditional access system according to another embodiment of the present invention.

FIG. 7 is a structural diagram of the video program receiving apparatus 400 used in a CA system according to another embodiment of the present invention. As shown in FIG. 7, the video program receiving apparatus 400 comprises: a receiving unit 204, and a resolving unit 202, both of which have the same functions and structures as those of the same units as shown in FIG. 5 and will not be described further. In addition, the video transmitting apparatus 300 further comprises: a control word decrypting unit 208 for using the decrypted entitlement key (MK) transmitted from the resolving unit 202 to decrypt the cipher text Ei (one of E1, E2, . . . , En belonging to the user, i.e. ECM) corresponding to the receiving apparatus 400 so as to obtain said control word (CW).

It also differs from the video receiving apparatus 200 in that: the program descrambling unit 206 of the video receiving apparatus 400 in the present embodiment uses said control word (CW) to decrypt the scrambled video program and transmits the descrambled video program to the receiving or playing device such as TV and etc. for reception or playback.

Herein, for any given legal user subset S in the complete set I containing all user nodes which can be accommodated, the entitlement key (MK) in MKCB(S, MK) can and only can be decrypted by the users in subset S, and the MK is used to encrypt CW (control word) into the ECM (entitlement control message) while CW is used to scramble the MPEG video stream. Thus the users in subset S (legal paid users), after decrypting MKCB to obtain the MK, can obtain CW by using MK to decrypt ECM, and thereby further obtain the descrambled MPEG Video stream.

Examples of Generating MKCB by Using the Binary Tree Algorithm

The examples of generating MKCB by using n-level binary tree algorithm will be described hereinafter in connection with FIGS. 8 and 9.

Figure 8:
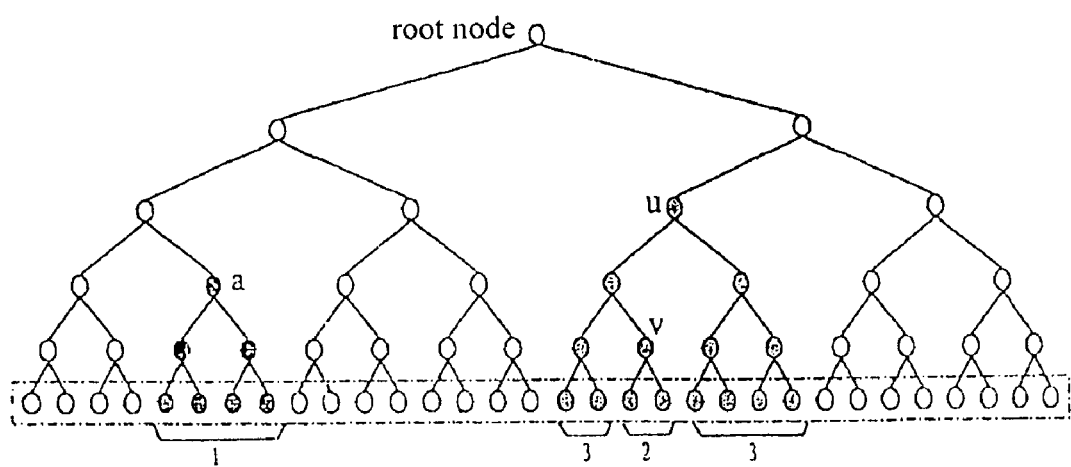
FIG. 8 is diagram showing an example of an n-level binary tree algorithm.

FIG. 8 shows a full binary tree with n levels. It is clear that there are $2^n-1$ nodes within the tree, including $2^{n-1}$ leaf nodes and one root node. A leaf node refers to a node without descendant nodes, i.e. the "lowermost" layer of the tree. In addition, each node can be treated as the root node of a certain sub-tree, which consists of the node itself and all its descendant nodes and is the sub-tree corresponding to the node. Let us associate every node with its corresponding sub-tree. For example, the root node is associated with the whole tree, and a leaf node is associated with a sub-tree that contains only the node itself. In FIG. 8, node 1 represents the sub-tree associated with node a, and node 2 represents the sub-tree associated with node v.

As shown in FIG. 8, sub-tree difference D'(u, v) is the set of sub-tree difference nodes. A sub-tree difference can be identified by two nodes u and v, where v is a descendant node of u. If T'(u) represents a sub-tree corresponding to node u, and T'(v) represents a sub-tree corresponding to node v, then the sub-tree difference D'(u, v) consists of all nodes that belong to the sub-tree of u but not belong to the sub-tree of v. It can be treated that the sub-tree associated with node u minus the sub-tree associated with node v, i.e. D'(u, v)=T'(u)−T'(v). In FIG. 8, a node 3 represents the sub-tree identified by sub-tree difference D'(u, v).

In the algorithm of the present invention, it is assumed that the complete set I is the set of all leaf nodes, i.e. all the nodes in the part surrounded by a dash and dot line in FIG. 8. That means, each leaf node represents a user, so the maximum number of users in this algorithm is $2^{n-1}$.

Figure 9:
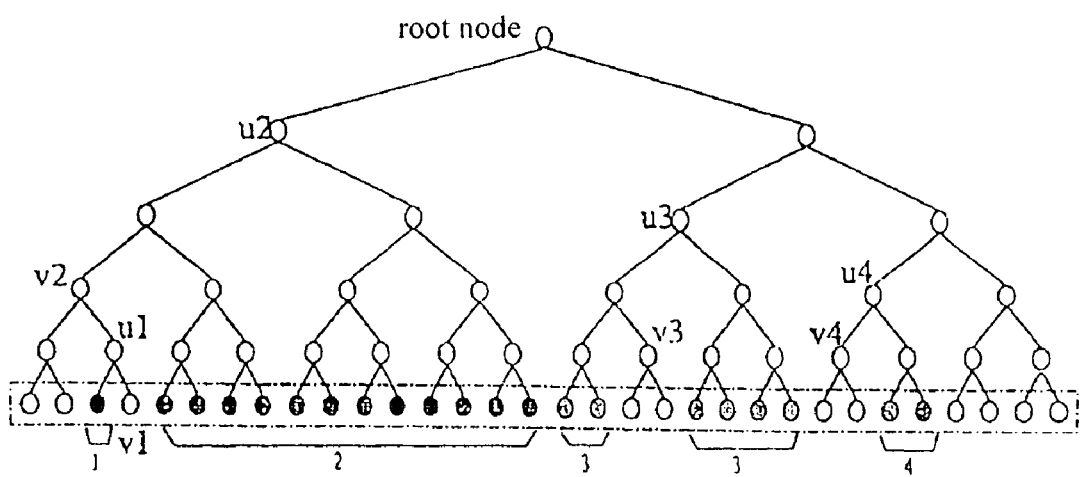
FIG. 9 is diagram further showing an example of an n-level binary tree algorithm.

As shown in FIG. 9, given S as a subset of I, it can be proved that there exist some subset differences whose union is subset S. That is to say, S can be split to some subset differences D(u, v). Here, said subset differences D(u, v) refers to the set of all the leaf nodes in sub-tree difference D'(u, v). FIG. 9 shows a split of subset S, where the subset S consists of all the marked leaf nodes. As shown in FIG. 9, the subset S is a union of each subset difference $D(u_1,v_1)$, $D(u_2,v_2)$, $D(u_3,v_3)$ and $D(u_4,v_4)$, where subset differences $D(u_1,v_1)=T(u_1)-T(v_1)$, $D(u_2,v_2)=T(u_2)-T(v_2)$, $D(u_3,v_3)=T(u_3)-T(v_3)$, and $D(u_4,v_4)=T(u_4)-T(v_4)$. Here, T(u) represents a set of all leaf nodes in T'(u), T(v) represents a set of all leaf nodes in T'(v).

Each subset difference D(u, v) has a cipher value K(u, v) (user key) assigned thereto, this cipher value K(u, v) must be distributed to all the users in the D(u, v). To any user not belonging to the D(u, v), the cipher value K(u, v) must be unknown and incomputable.

Let MKB be the union of E(K(u, v),MK), where E(K(u, v), MK) represents the cipher-text obtained by using K(u, v) in each subset difference D(u, v) as a user key to encrypt an entitlement key. Thus, this MKCB can only be decrypted by users with one of these K(u, v)s, which means that the user who can decrypt the MKCB belongs to one of these subset differences D(u, v). Since the union of these subset differences is subset S, only the users within S can obtain MK.

The constitution of media key control block MKCB is described by examples hereinafter. As shown in FIG. 9, assuming subset S of legal users can be split into 4 subset differences $D(u_1,v_1)$, $D(u_2,v_2)$, $D(u_3,v_3)$ and $D(u_4,v_4)$, then respectively, cipher value $K_1$ should be distributed to the users in subset difference $D(u_1,v_1)$, cipher value $K_2$ should be distributed to the users in subset difference $D(u_2,v_2)$, cipher value $K_3$ should be distributed to the user in subset difference $D(u_3,v_3)$, and cipher value $K_4$ should be distributed to the users in subset difference $D(u_4,v_4)$. Furthermore, cipher-text $E_1$ can be obtained by using the cipher value $K_1$ to encrypt the entitlement key (MK), cipher-text $E_2$ can be obtained by using the cipher value $K_2$ to encrypt the entitlement key (MK), cipher-text $E_3$ can be obtained by using the cipher value $K_3$ to encrypt the entitlement key (MK), and cipher-text $E_4$ can be obtained by using the cipher value $K_4$ to encrypt the entitlement key (MK). As can be seen from the above, media key control block MKCB=$\{E_1,E_2,E_3,E_4\}$.

Thus, when the receiving apparatus of the user receives the MKCB, the information in the MKCB is filtered and identified. The identifying method can be as follows: for example, assigning respective IDs to all the cipher-text $E_1$, $E_2$, $E_3$ and $E_4$ in the MKCB, or placing all the cipher-texts $E_1$, $E_2$, $E_3$ and $E_4$ at the positions with corresponding IDs in MKCB, detecting the cipher-text with the ID corresponding to itself in the user's apparatus in each subset difference D(u, v), or detecting the cipher-text at the position with the ID corresponding to itself, so as to conduct decryption. That is, the users belonging to the subset difference $D(u_1, v_1)$ detect the information containing $E_1$ in the MKCB, and use the cipher value $K_1$ they own to decrypt $E_1$ so as to obtain the MK; the users belonging to the subset difference $D(u_2, v_2)$ detect the information containing $E_2$ in the MKCB, and use the cipher value $K_2$ they own to decrypt $E_2$ so as to obtain the MK; the users belonging to the subset difference $D(u_3, V_3)$ detect the information containing $E_3$ in the MKCB, and use the cipher value $K_3$ they own to decrypt $E_3$ so as to obtain the MK; and the users belonging to the subset difference $D(u_4, v_4)$ detect the information containing $E_4$ in the MKCB, and use the cipher value $K_4$ they own to decrypt $E_4$ so as to obtain the MK.

It is known from the above that only those users in one of the subset differences constituting the legal user subset S can obtain the MK.

The Problem as to the Amount of User Keys Each User Needs to Store

In a conventional method, each user must store (or may deduce) the cipher value $K(u, v)$ (user key) corresponding to all subset differences $D(u, v)$ containing himself in subset S. These user keys are distributed to legal users (e.g. paid users) by an operator for decrypting the MKCB, according to the present invention, broadcast by the operator, so as to obtain the entitlement keys being necessary to watch an encrypted video program. These user keys can, for example, be stored in a smart card.

It can be known through a simple calculation that, for an n-level binary tree, the number of the subset differences containing a certain leaf node is $2^n-n-1$, which is of the same order of magnitude as $2^n$, i.e. $0(2^n)$. When n is smaller, i.e. the amount of subset differences is smaller, a direct storage method can be adopted, i.e. a method of directly storing these user keys of small amount into e.g. a smart card; and when n is quite large, the number of subset differences increases according to a geometric series and will become very large, at which time it will be very difficult to distribute or store such a large amount of subset differences.

In the present invention, when n is quite large or the storage space is limited, the following method can be adopted to compress the key space:

When assigning $K(u, v)$ to each subset difference $D(u, v)$, the following algorithm is adopted:
(1) if u is the parent node of v, then assign directly a random key (or adopt another method to deduce);
(2) if u is not the parent node of v and the parent node of v is vf, then in the case of given $K(u, v_f)$, $K(u, v)$ can be computed from $K(u, v_f)$ by using an unidirectional major function.

The so-called unidirectional major function is an usual concept in encryption algorithms, which is as follows: another value can be simply computed from a value by using a certain method, but it is very difficult to deduce back from the computed value to the original value, that is, in a function $y=f(x)$, it is easy to compute y from x because of the known function relation, but it is very difficult to compute x from y because of not knowing its inverse function relation.

It is easy to see that this is a convergent recursive algorithm. After the present invention uses such an algorithm, each user need not store $K(u, v)$ corresponding to all the subset differences $D(u, v)$ containing himself, because most $K(u, v)$ can be deduced from other $K(u, v)$s. It is easy to check that at this time each user only needs to store $n(n-1)/2$ keys which is of the same order of magnitude as $n^2/2$, i.e. $0(n^2/2)$, not of the same order of magnitude as $2^n$. So the amount of user keys to be stored is greatly reduced, while it can be seen that the safety of the whole system is not reduced because of the feature of the unidirectional major function.

Division of Subset Differences in Subset S

When a CA system is established, the capacity of users therein (i.e. the amount of all the leaf nodes) is definite. When a user occupies a node because of jointing the system, the position of the user is fixed for the system. All the corresponding subset differences of the position is also fixed with respect to the whole system. The division of all subset differences $D(u, v)$ and their corresponding cipher values $K(u, v)$ are stored in a database of the system (not shown) through corresponding programs.

In addition, the operator distributes the cipher value $K(u, v)$ (user key) corresponding to all subset differences $D(u, v)$ containing the node to the user at the position of the node, e.g. in a form of smart card as described above. Thus, when a certain user joins or leaves subset S, the system automatically computes all subset differences $D(u, v)$ corresponding to the situation in subset S after the user joins or leaves, and broadcasts to each user the media key control block (MKCB) formed by using cipher values $K(u, v)$ in the subset differences $D(u, v)$ to encrypt the entitlement keys (MKs). Because the user at each position has $K(u, v)$ corresponding to each subset difference $D(u, v)$ after the change, he can decrypt the media key control block (MKCB) without being effected to obtain the entitlement key MK.

Using MKCB Method to Add In and Remove Users

In a system with unfilled capacity, there are spare nodes that are not occupied by users. If a new user joins the system, he/she will occupy one of the nodes and obtain a set of keys corresponding to the node, i.e. the user keys as described above. This procedure can be implemented by distributing practically a smart card or by broadcasting or by other means. if using a smart card, a user can insert the smart card into a suitable receiving apparatus (such as a set-top box) and wait to receive the MKCB broadcast transmitted from the operator. At this time, the subset S of legal users should be changed to S'=S+A, where A represents the node of the new user.

When a new user joins, the division of subset differences changes. Meantime, a new MKCB should be generated for a new S' and MK', where MK' can be a new entitlement key or can be the original entitlement key (MK). When the original MKCB is replaced by the new MKCB, the new user joins the system successfully.

In the case that a plurality of users join the system, the process is the same as the above process. The only difference is S'=S+A', where A' represents a set of all nodes of the new users.

If a user wants to quit the system, or his/her apparatus has a secret divulged or is intruded illegally, the user should be removed from the system. In this case, the set S of all legal users should become S'=S−A, where A represents the node of the user.

When a user quits the system, the division of the subset differences also changes, and a new MKCB should be generated for the new S' and MK', where MK' should be a new entitlement key and can not be the original entitlement key. When the new MKCB replaces the original MKCB, the user is removed successfully from the system.

In the case that a plurality of users is removed from the system, the process is the same as the above one. The only difference is S'=S−A', where A' represents a set of all nodes of the removed users.

For the users who quit the system, the system can adopt the following methods to cease their right of watching the encrypted video programs: (1) send messages for closing the MKCB receiving function of the users, and change the entitlement key (MK) in the set S of current legal users; (2) stop transmitting to the users media key control block (MKCB) containing the entitlement key (MK).

For new users who just join the system, because they already have user keys $K(u, v)$ corresponding to every subset difference $D(u, v)$ at the position of the node, they can, after receiving the media key control block (MKCB), decrypt it so as to obtain the entitlement key (MK).

In addition, a user's joining or being removed (quitting) from the system takes as a triggering condition whether the user performs the registration procedure (such as whether he has paid). The system can detect this case, automatically compute the changed subset difference D(u, v), and perform the transmission or the cease of the transmission of media key control block (MKCB).

Analysis Result of the Sub-Tree Algorithm

If set (I-S) has r nodes, i.e. the number of free leaf nodes as shown in FIG. 4 is r, it can be proved through a mathematical induction that: the subset S is a union set of less than (2r−1) subset differences. It can also be computed through a probability statistics formula that, on average, the expectation number of subset differences increases by 2ln2, i.e. about 1.38, when r increases by 1. Therefore the average value of the number of the subset differences is about 2rln2, i.e. 1.38r. If r is large, the expectation value will decrease. It can be seen from the example in FIG. 5 that r=11, and the number of the subset differences that subset S can be divided into is at most 21, complying with the above formula 2×11−1=21.

If the subset S has m nodes, then the subset differences needed by the subset S can not be more than m, because each subset difference can cover at least one node. In general, the estimation can be greatly reduced, since each subset difference can cover a lot of nodes. It indicates that the present method can not be worse than encrypting and transmitting information node by node even in the worst case.

In addition, in the method of the present invention, the coverage of subset S is accomplished by using subset differences D(u, v), in which manner the number of subset differences in most cases will be relatively small. But the present invention is not limited to this, and other methods can be adopted, such as using subset T(u) directly for coverage.

An advantage of directly using subset for coverage is that the number of user keys which a user needs to store is relatively small, and each user needs only to store n keys. But its defect is also very obvious, for example, when only one user needs to be removed, the whole binary tree will be divided into n−1 subsets, the cost of which is that this number is greatly large with respect to subset difference coverage (in this case, only one subset difference is necessary).

The present invention can also consider general tree structures which are not only the binary tree but also a ternary tree or a multiple tree. In general tree structures, the method of direct subset coverage as well as subset difference coverage can also be considered.

In addition, the present invention is not limited to the method of using a sub-tree, other methods can also be adopted to implement the hierarchical grouping of users in the present invention and make the condition of the grouping practically changed along with the increase or reduction of efficient users, so as to reduce the length of the message contained in MKCB.

Advantages of MKCB Method

Compared with the conventional CA system, MKCB method has two main advantages: Firstly, according to the sub-tree algorithm, the length of MKCB is made greatly shorter than that of conventional EMM. The length of MKCB depends on the number of subset differences in the division of subset S. In the case that a few users are removed from the system or the tree structure of subset S is very "clean" (i.e. the node positions in the tree structure is relatively concentrated and tidy)", the length of MKCB becomes greatly shorter than that of conventional linear EMM, while the length of the conventional linear EMM is linearly proportional to the number of the users. The shorter MKCB can be realized, the more bandwidth can be saved.

Secondly, in the conventional CA system, the removal of some users will make the other users in the same group changed to those of a new group(s), wherein it is extremely important to ensure the other users to correctly change their group(s). But in order to achieve the object, it takes a lot of bandwidth to encrypt the information to be transmitted. In the present invention, because MKCB is very short, its broadcast and distribution time and form is very flexible, and when some users are removed from the system, the other users need not to be changed to a new group(s), thereby bringing about very little effect to the other users.

While the embodiment of the present invention has been described in detail, it will be understood by those skilled in the art that various changes may be made therein without departing from the spirit and scope of the invention as defined by the appended claims.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising key distribution in a conditional access system, wherein a set of all user nodes which the system can accommodate is a complete set, and a subset is composed of all or part of the user nodes, said key distribution comprising the steps of:
   decomposing said subset into at least one secondary subset;
   assigning a different user key to each secondary subset, each said user key being transmitted to all users in a corresponding secondary subset;
   encrypting an entitlement key by using each said user key so as to generate a cipher text corresponding to each said secondary subset; and
   combining said cipher text to generate a media key control block.

2. A method according to claim 1, further comprising the step of transmitting said media key control block to all users in said subset.

3. A method according to claim 1, wherein a video program is encrypted using said entitlement key.

4. A method according to claim 3, wherein the users of each said secondary subset identifies said cipher text of the secondary subset to which a user belongs from said media key control block, and decrypts said cipher text by using the user key of said user so as to obtain said entitlement key.

5. A method according to claim 1, wherein a control word is encrypted using said entitlement key, and a video program is encrypted using said control word.

6. A method according to claim 1, wherein said media key control block can be transmitted uni-directionally on a broadcast channel.

7. A method according to claim 1, wherein said decomposed secondary subset can be maintained unchanged after the setup of said system.

8. A method according to claim 1, wherein a binary tree algorithm is used to decompose said subset into said at least one secondary subset.

9. A method according to claim 1, wherein a multiple tree algorithm is used to decompose said subset into said at least one secondary subset.

10. An article of manufacture comprising a computer usable medium having computer readable program code means embodied therein for causing key distribution, the computer readable program code means in said article of manufacture comprising computer readable program code means for causing a computer to effect the steps of claim 1.

11. A program storage device readable by machine, tangibly embodying a program of instructions executable by the machine to perform method steps for key distribution, said method steps comprising the steps of claim 1.

12. An apparatus for key distribution in a conditional access system, wherein a set of all user nodes which the system can accommodate is a complete set, and a subset is composed of all or part of the user nodes, said apparatus comprising:
   a decomposing unit for decomposing said subset into at least one secondary subset, and assigning a different user key to each secondary subset, each said user key being transmitted to all users in a corresponding secondary subset;
   a generating unit for encrypting an entitlement key by using each said user key so as to generate each cipher text corresponding to each said secondary subset;
   a combining unit for combining said cipher text to generate a media key control block; and
   an entitlement control means for controlling the corresponding operation of each said unit and outputting said media key control block.

13. An apparatus for key distribution according to claim 12, further comprising a transmitting means for transmitting said media key control block received from said entitlement control means to all users in said subset.

14. A computer program product comprising a computer usable medium having computer readable program code means embodied therein for causing key distribution, the computer readable program code means in said computer program product comprising computer readable program code means for causing a computer to effect the functions of claim 12.

15. A transmitting apparatus in a conditional access system, wherein a set of all user nodes which the system can accommodate is a complete set, and a subset is composed of all or part of the user nodes, comprising:
   a decomposing unit for decomposing said subset into at least one secondary subset, and assigning a different user key to each secondary subset, each said user key being transmitted to all users in a corresponding secondary subset;
   a generating unit for encrypting an entitlement key using each said user key so as to generate a cipher text corresponding to each said secondary subset;
   a combining unit for combining said cipher text to generate a media key control block;
   a program scrambling unit for scrambling a video program by using said entitlement key;
   a transmitting unit for transmitting the scrambled video program and said media key control block to a receiving apparatus; and
   an entitlement control means for controlling the corresponding operation of each of said units and outputting said media key control block to said transmitting unit.

16. A transmitting apparatus according to claim 15, wherein said transmitting apparatus further comprises a control word encrypting unit for encrypting a control word into said cipher text by using said entitlement key under the control of said entitlement control means, wherein said program scrambling unit encrypts said video program by using said control word.

17. A transmitting apparatus according to claim 16, wherein said cipher text is an entitlement control message (ECM).

18. A transmitting apparatus according to claim 15, wherein said decomposing unit decomposes said subset using a binary tree algorithm into said at least one secondary subset.

19. A transmitting apparatus according to claim 15, wherein said decomposing unit decomposes said subset into said at least one secondary subset using a multiple tree algorithm.

20. A transmitting apparatus according to claim 15, wherein said entitlement control means is also used for controlling user information.

21. A computer program product comprising a computer usable medium having computer readable program code means embodied therein for causing transmission, the computer readable program code means in said computer program product comprising computer readable program code means for causing a computer to effect the functions of claim 15.

22. A receiving apparatus in a conditional access system, wherein a set of all user nodes which the system can accommodate is a complete set, and a subset is composed of all or part of the user nodes, comprising:
- a receiving unit for receiving the scrambled video program and media key control block transmitted from a transmitting apparatus;
- a resolving unit for decrypting a cipher text by using a user key so as to obtain an entitlement key, wherein said cipher text is obtained by identifying said media key block using the user key corresponding to the secondary subset to which said receiving apparatus belongs, and said secondary subset is obtained by decomposing said subset; and
- a program descrambling unit for decrypting said scrambled video program by using said entitlement key.

23. The receiving apparatus according to claim 22, wherein said receiving apparatus further comprises a control word decrypting unit for decrypting said cipher text by using said entitlement key so as to obtain a control word; wherein said program descrambling unit descrambles said video program by using said control word.

24. The receiving apparatus according to claim 23, wherein said cipher text is an entitlement control message (ECM).

25. A computer program product comprising a computer usable medium having computer readable program code means embodied therein for causing reception, the computer readable program code means in said computer program product comprising computer readable program code means for causing a computer to effect the functions of claim 22.

* * * * *